United States Patent
McCloud et al.

(10) Patent No.: US 9,735,816 B2
(45) Date of Patent: Aug. 15, 2017

(54) INTERFERENCE SUPPRESSION FOR CDMA SYSTEMS

(71) Applicant: III HOLDINGS 1, LLC, Wilmington, DE (US)

(72) Inventors: Michael L. McCloud, Boulder, CO (US); Vijay Nagarajan, Boulder, CO (US)

(73) Assignee: III Holdings 1, LLC, Wilmington, DE (US)

( * ) Notice: Subject to any disclaimer, the term of this patent is extended or adjusted under 35 U.S.C. 154(b) by 0 days.

(21) Appl. No.: 14/713,740

(22) Filed: May 15, 2015

(65) Prior Publication Data

US 2015/0318883 A1 Nov. 5, 2015

Related U.S. Application Data

(63) Continuation of application No. 12/966,953, filed on Dec. 13, 2010, now abandoned, which is a continuation of application No. 11/266,928, filed on Nov. 4, 2005, now Pat. No. 7,876,810, which is a continuation-in-part of application No. 11/233,636, filed on Sep. 23, 2005, now Pat. No. 8,761,321, and
(Continued)

(51) Int. Cl.
| | |
|---|---|
| *H04B 1/00* | (2006.01) |
| *H04B 1/10* | (2006.01) |
| *H04B 1/7103* | (2011.01) |
| *H04B 1/7107* | (2011.01) |
| *H04B 1/712* | (2011.01) |

(52) U.S. Cl.
CPC ......... *H04B 1/1027* (2013.01); *H04B 1/7103* (2013.01); *H04B 1/7107* (2013.01); *H04B 1/712* (2013.01)

(58) Field of Classification Search
CPC .................................................... H04B 1/1027
USPC ............................................................ 375/148
See application file for complete search history.

(56) References Cited

U.S. PATENT DOCUMENTS

| | | | |
|---|---|---|---|
| 3,742,201 A | 6/1973 | Groginsky | 235/156 |
| 4,088,955 A | 5/1978 | Baghdady | 325/56 |

(Continued)

FOREIGN PATENT DOCUMENTS

| | | | |
|---|---|---|---|
| DE | 4201439 | 7/1993 | H04L 27/00 |
| DE | 4326843 | 2/1995 | H04B 7/08 |

(Continued)

OTHER PUBLICATIONS

B. Widrow, S. Stearns, "Adaptive Signal Processing", Prentice Hall, Signal Processing Series, ISBN 0-13-004029-01, 1985.
(Continued)

*Primary Examiner* — Lihong Yu
(74) *Attorney, Agent, or Firm* — McAndrews, Held & Malloy, Ltd.

(57) ABSTRACT

Interference is cancelled from a baseband signal by synthesizing interference from estimated symbols in interfering subchannels. The estimated symbols are hard-coded, soft weighted, or zeroed, depending on the value of an estimated pre-processed signal-to-interference-and-noise ratio (SINR) in each subchannel in order to maximize a postprocessed SINR. The estimated pre-processed SINR is obtained from averages of estimated symbol energies and estimated noise variances, or from related statistical procedures.

20 Claims, 4 Drawing Sheets

Related U.S. Application Data a continuation-in-part of application No. 11/100,935, filed on Apr. 7, 2005, now abandoned, which is a continuation-in-part of application No. 10/773,777, filed on Feb. 6, 2004, now Pat. No. 7,394,879, and a continuation-in-part of application No. 10/686,359, filed on Oct. 15, 2003, now Pat. No. 7,068,706, and a continuation-in-part of application No. 10/686,829, filed on Oct. 15, 2003, now Pat. No. 7,580,448, and a continuation-in-part of application No. 10/294,834, filed on Nov. 15, 2002, now Pat. No. 7,200,183, and a continuation-in-part of application No. 10/247,836, filed on Sep. 20, 2002, now Pat. No. 7,158,559.

(56) References Cited

U.S. PATENT DOCUMENTS

| | | | | |
|---|---|---|---|---|
| 4,309,769 | A | 1/1982 | Taylor, Jr. | 375/1 |
| 4,359,738 | A | 11/1982 | Lewis | 343/100 |
| 4,601,046 | A | 7/1986 | Halpern et al. | 375/38 |
| 4,665,401 | A | 5/1987 | Garrard et al. | 342/75 |
| 4,670,885 | A | 6/1987 | Parl et al. | 375/1 |
| 4,713,794 | A | 12/1987 | Byington et al. | 365/45 |
| 4,780,885 | A | 10/1988 | Paul et al. | 375/40 |
| 4,856,025 | A | 8/1989 | Takai | 375/40 |
| 4,893,316 | A | 1/1990 | Janc et al. | 375/44 |
| 4,922,506 | A | 5/1990 | McCallister et al. | 375/1 |
| 4,933,639 | A | 6/1990 | Barker | 324/309 |
| 4,965,732 | A | 10/1990 | Roy, III et al. | 364/460 |
| 5,017,929 | A | 5/1991 | Tsuda | 342/427 |
| 5,099,493 | A | 3/1992 | Zeger et al. | 375/1 |
| 5,105,435 | A | 4/1992 | Stilwell | 375/1 |
| 5,109,390 | A | 4/1992 | Gilhousen et al. | 375/1 |
| 5,119,401 | A | 6/1992 | Tsujimoto | 375/14 |
| 5,136,296 | A | 8/1992 | Roettger et al. | 342/26 |
| 5,140,615 | A | 8/1992 | Jasper | |
| 5,151,919 | A | 9/1992 | Dent | 375/1 |
| 5,157,671 | A * | 10/1992 | Karplus | H03M 13/1111 714/752 |
| 5,218,359 | A | 6/1993 | Minamisono | 342/383 |
| 5,218,619 | A | 6/1993 | Dent | 375/1 |
| 5,220,687 | A | 6/1993 | Ichikawa et al. | 455/254 |
| 5,224,122 | A | 6/1993 | Bruckert | 375/1 |
| 5,237,586 | A | 8/1993 | Bottomley | 375/1 |
| 5,263,191 | A | 11/1993 | Dickerson | 455/304 |
| 5,280,472 | A | 1/1994 | Gilhousen et al. | 370/18 |
| 5,305,349 | A | 4/1994 | Dent | 375/1 |
| 5,325,394 | A | 6/1994 | Bruckert | 375/1 |
| 5,343,493 | A | 8/1994 | Karimullah | 375/1 |
| 5,343,496 | A | 8/1994 | Honig et al. | 375/1 |
| 5,347,535 | A | 9/1994 | Karasawa et al. | 375/1 |
| 5,353,302 | A | 10/1994 | Bi | 375/1 |
| 5,377,183 | A | 12/1994 | Dent | 370/18 |
| 5,386,202 | A | 1/1995 | Cochran et al. | 332/100 |
| 5,390,207 | A | 2/1995 | Fenton et al. | 375/1 |
| 5,394,110 | A | 2/1995 | Mizoguchi | 329/304 |
| 5,396,256 | A | 3/1995 | Chiba et al. | 342/372 |
| 5,423,045 | A | 6/1995 | Kannan | |
| 5,437,055 | A | 7/1995 | Wheatley, III | 455/33.3 |
| 5,440,265 | A | 8/1995 | Cochran et al. | 329/300 |
| 5,448,600 | A | 9/1995 | Lucas | 375/205 |
| 5,481,570 | A | 1/1996 | Winters | 375/347 |
| 5,506,865 | A | 4/1996 | Weaver, Jr. | 375/205 |
| 5,513,176 | A | 4/1996 | Dean et al. | 370/18 |
| 5,533,011 | A | 7/1996 | Dean et al. | 370/18 |
| 5,553,062 | A | 9/1996 | Schilling | 370/18 |
| 5,553,098 | A | 9/1996 | Cochran et al. | 375/324 |
| 5,602,833 | A | 2/1997 | Zehavi | 370/209 |
| 5,606,560 | A | 2/1997 | Malek | |
| 5,644,592 | A | 7/1997 | Divsalar et al. | 375/206 |
| 5,736,964 | A | 4/1998 | Ghosh et al. | 342/457 |
| 5,787,130 | A | 7/1998 | Kotzin et al. | 375/346 |
| 5,812,086 | A | 9/1998 | Bertiger et al. | 342/357 |
| 5,844,521 | A | 12/1998 | Stephens et al. | 342/357 |
| 5,859,613 | A | 1/1999 | Otto | 342/463 |
| 5,872,540 | A | 2/1999 | Casabona et al. | 342/362 |
| 5,872,776 | A | 2/1999 | Yang | 370/342 |
| 5,894,500 | A | 4/1999 | Bruckert et al. | 375/346 |
| 5,926,761 | A | 7/1999 | Reed et al. | 455/440 |
| 5,930,229 | A | 7/1999 | Yoshida et al. | 370/203 |
| 5,953,369 | A | 9/1999 | Suzuki | 375/206 |
| 5,978,413 | A | 11/1999 | Bender | 375/206 |
| 5,995,499 | A | 11/1999 | Hottinen et al. | 370/337 |
| 6,002,727 | A | 12/1999 | Uesugi | 375/346 |
| 6,014,373 | A | 1/2000 | Schilling et al. | 370/342 |
| 6,018,317 | A | 1/2000 | Dogan et al. | 342/378 |
| 6,032,056 | A | 2/2000 | Reudink | 455/560 |
| 6,078,611 | A | 6/2000 | La Rosa et al. | 375/206 |
| 6,088,383 | A | 7/2000 | Suzuki et al. | 375/148 |
| 6,101,385 | A | 8/2000 | Monte et al. | 455/427 |
| 6,104,712 | A | 8/2000 | Robert et al. | 370/389 |
| 6,115,409 | A | 9/2000 | Upadhyay et al. | 375/144 |
| 6,127,973 | A | 10/2000 | Choi et al. | 342/378 |
| 6,131,013 | A | 10/2000 | Bergstrom et al. | 455/63 |
| 6,131,031 | A * | 10/2000 | Lober | H04W 16/14 455/443 |
| 6,137,788 | A | 10/2000 | Sawahashi et al. | 370/342 |
| 6,141,332 | A | 10/2000 | Lavean | 370/335 |
| 6,154,443 | A | 11/2000 | Huang et al. | 370/210 |
| 6,157,685 | A | 12/2000 | Tanaka et al. | 375/346 |
| 6,157,842 | A | 12/2000 | Kaisson et al. | 455/456 |
| 6,157,847 | A | 12/2000 | Buehrer et al. | 455/561 |
| 6,163,696 | A | 12/2000 | Bi et al. | 455/436 |
| 6,166,690 | A | 12/2000 | Lin et al. | 342/383 |
| 6,172,969 | B1 | 1/2001 | Kawakami et al. | 370/342 |
| 6,173,008 | B1 | 1/2001 | Lee | 375/148 |
| 6,175,587 | B1 | 1/2001 | Madhow et al. | 375/148 |
| 6,175,588 | B1 | 1/2001 | Visotsky | 375/148 |
| 6,177,906 | B1 * | 1/2001 | Petrus | H01Q 3/26 342/373 |
| 6,185,716 | B1 | 2/2001 | Riggle | 714/769 |
| 6,192,067 | B1 | 2/2001 | Toda | |
| 6,201,799 | B1 | 3/2001 | Huang et al. | 370/342 |
| 6,215,812 | B1 | 4/2001 | Young et al. | 375/144 |
| 6,219,376 | B1 | 4/2001 | Zhodzishsky et al. | 375/148 |
| 6,222,828 | B1 | 4/2001 | Ohlson et al. | 370/320 |
| 6,230,180 | B1 | 5/2001 | Mohamed | 708/523 |
| 6,233,229 | B1 | 5/2001 | Ranta et al. | 370/330 |
| 6,233,459 | B1 | 5/2001 | Sullivan et al. | 455/456 |
| 6,240,124 | B1 | 5/2001 | Wiedeman et al. | 375/130 |
| 6,252,535 | B1 | 6/2001 | Kober et al. | 341/155 |
| 6,256,336 | B1 | 7/2001 | Rademacher et al. | 375/140 |
| 6,259,688 | B1 | 7/2001 | Schilling et al. | 370/342 |
| 6,263,208 | B1 | 7/2001 | Chang et al. | 455/456 |
| 6,266,529 | B1 | 7/2001 | Chheda | 455/436 |
| 6,269,075 | B1 | 7/2001 | Tran | 370/206 |
| 6,275,186 | B1 | 8/2001 | Kong | 342/363 |
| 6,278,726 | B1 | 8/2001 | Mesecher et al. | 375/148 |
| 6,282,231 | B1 | 8/2001 | Norman et al. | 375/144 |
| 6,282,233 | B1 | 8/2001 | Yoshida | 375/148 |
| 6,285,316 | B1 | 9/2001 | Nir et al. | 342/357.09 |
| 6,285,319 | B1 | 9/2001 | Rose | 342/449 |
| 6,285,861 | B1 | 9/2001 | Bonaccorso et al. | 455/137 |
| 6,295,311 | B1 | 9/2001 | Sun | 375/147 |
| 6,301,289 | B1 | 10/2001 | Bejjani et al. | 375/144 |
| 6,304,618 | B1 | 10/2001 | Hafeez et al. | 375/341 |
| 6,308,072 | B1 | 10/2001 | Labedz et al. | 455/448 |
| 6,310,704 | B1 | 10/2001 | Dogan et al. | 359/127 |
| 6,317,453 | B1 | 11/2001 | Chang | 375/140 |
| 6,321,090 | B1 | 11/2001 | Soliman | 455/440 |
| 6,324,159 | B1 | 11/2001 | Mennekens et al. | 370/203 |
| 6,327,471 | B1 | 12/2001 | Song | 455/440 |
| 6,330,460 | B1 | 12/2001 | Wong et al. | 455/562 |
| 6,333,947 | B1 | 12/2001 | van Heeswyk et al. | 375/148 |
| 6,351,235 | B1 | 2/2002 | Stilp | 342/357.06 |
| 6,351,642 | B1 | 2/2002 | Corbett et al. | 455/442 |
| 6,359,874 | B1 | 3/2002 | Dent | 370/342 |
| 6,362,760 | B2 | 3/2002 | Kober et al. | 341/141 |
| 6,363,103 | B1 | 3/2002 | Buehrer | |
| 6,363,104 | B1 | 3/2002 | Bottomley | 375/148 |
| 6,377,607 | B1 | 4/2002 | Ling et al. | 375/130 |
| 6,377,636 | B1 | 4/2002 | Paulraj et al. | 375/346 |
| 6,380,879 | B2 | 4/2002 | Kober et al. | 341/155 |

(56) References Cited

U.S. PATENT DOCUMENTS

| | | | |
|---|---|---|---|
| 6,385,264 B1 | 5/2002 | Terasawa et al. | 375/371 |
| 6,396,804 B2 | 5/2002 | Odenwalder | 370/209 |
| 6,404,760 B1 | 6/2002 | Holtzman et al. | 370/342 |
| 6,414,949 B1 | 7/2002 | Boulanger | 370/335 |
| 6,430,216 B1 | 8/2002 | Kober | 375/148 |
| 6,449,246 B1 | 9/2002 | Barton et al. | 370/328 |
| 6,459,693 B1 | 10/2002 | Park et al. | 370/342 |
| 6,466,611 B1 | 10/2002 | Bachu | 375/144 |
| 6,501,788 B1 | 12/2002 | Wang et al. | 375/148 |
| 6,515,980 B1 | 2/2003 | Bottomley | 370/342 |
| 6,522,683 B1 | 2/2003 | Smee | 375/144 |
| 6,570,909 B1 | 5/2003 | Kansakoski et al. | 375/148 |
| 6,570,919 B1 | 5/2003 | Lee | 375/233 |
| 6,574,270 B1 * | 6/2003 | Madkour | H04B 1/71072 375/144 |
| 6,580,771 B2 | 6/2003 | Kenney | 375/346 |
| 6,584,115 B1 | 6/2003 | Suzuki | 370/441 |
| 6,590,888 B1 | 7/2003 | Ohshima | 370/342 |
| 6,668,011 B1 | 12/2003 | Li et al. | 375/147 |
| 6,680,727 B2 | 1/2004 | Butler et al. | 345/147 |
| 6,687,723 B1 | 2/2004 | Ding | 708/322 |
| 6,690,723 B1 | 2/2004 | Gosse | 375/233 |
| 6,714,585 B1 | 3/2004 | Wang et al. | 375/148 |
| 6,724,809 B2 | 4/2004 | Reznik | 375/148 |
| 6,741,634 B1 | 5/2004 | Kim | |
| 6,754,340 B1 | 6/2004 | Ding | 379/406.08 |
| 6,785,341 B2 | 8/2004 | Walton | |
| 6,798,737 B1 | 9/2004 | Dabak et al. | 370/209 |
| 6,801,565 B1 | 10/2004 | Bottomley et al. | 375/148 |
| 6,829,313 B1 | 12/2004 | Xu | 375/341 |
| 6,839,390 B2 | 1/2005 | Mills | 375/224 |
| 6,882,678 B2 | 4/2005 | Kong et al. | 375/144 |
| 6,931,052 B2 | 8/2005 | Fuller | 375/144 |
| 6,956,893 B2 | 10/2005 | Frank | 375/147 |
| 6,963,546 B2 | 11/2005 | Misra | 370/294 |
| 6,975,666 B2 | 12/2005 | Affes et al. | 375/148 |
| 6,975,669 B2 | 12/2005 | Ling | 375/141 |
| 6,975,671 B2 | 12/2005 | Sindhushayana | 375/144 |
| 6,985,516 B1 | 1/2006 | Easton | |
| 7,010,073 B2 | 3/2006 | Black et al. | 375/355 |
| 7,027,533 B2 | 4/2006 | Abe et al. | 375/341 |
| 7,397,842 B2 | 7/2008 | Bottomley et al. | 375/148 |
| 2001/0003443 A1 | 6/2001 | Velazquez et al. | 342/367 |
| 2001/0020912 A1 | 9/2001 | Naruse et al. | 342/357.06 |
| 2001/0021646 A1 | 9/2001 | Antonucci et al. | 455/404 |
| 2001/0028677 A1 | 10/2001 | Wang et al. | 375/148 |
| 2001/0046266 A1 | 11/2001 | Rakib et al. | 375/259 |
| 2002/0001299 A1 | 1/2002 | Petch et al. | 370/350 |
| 2002/0051433 A1 | 5/2002 | Affes et al. | 370/335 |
| 2002/0060999 A1 | 5/2002 | Ma | 370/329 |
| 2002/0131534 A1 | 9/2002 | Ariyoshi | 375/148 |
| 2002/0154717 A1 | 10/2002 | Shima | 375/148 |
| 2002/0172173 A1 | 11/2002 | Schilling et al. | 370/335 |
| 2002/0176488 A1 | 11/2002 | Kober | 375/147 |
| 2002/0186761 A1 | 12/2002 | Corbaton | |
| 2002/0191676 A1 | 12/2002 | Kenneth | 375/130 |
| 2003/0005009 A1 | 1/2003 | Usman | 708/322 |
| 2003/0012264 A1 | 1/2003 | Papasakellariou | 375/148 |
| 2003/0035468 A1 | 2/2003 | Corbaton | |
| 2003/0050020 A1 | 3/2003 | Erceg | |
| 2003/0053524 A1 | 3/2003 | Dent | 375/148 |
| 2003/0053526 A1 | 3/2003 | Reznik | 375/148 |
| 2003/0092456 A1 | 5/2003 | Dent | 455/503 |
| 2003/0095590 A1 | 5/2003 | Fuller | 375/144 |
| 2003/0156630 A1 | 8/2003 | Sriram | 375/148 |
| 2003/0198201 A1 | 10/2003 | Ylitalo | |
| 2003/0210667 A1 | 11/2003 | Zhengdi | 375/130 |
| 2003/0219085 A1 | 11/2003 | Endres | 375/233 |
| 2004/0008765 A1 | 1/2004 | Chung | 375/233 |
| 2004/0013190 A1 | 1/2004 | Jayaraman | 375/233 |
| 2004/0076224 A1 | 4/2004 | Onggosanusi | 375/141 |
| 2004/0136445 A1 | 7/2004 | Olson et al. | 375/316 |
| 2004/0161065 A1 | 8/2004 | Buckley | 375/350 |
| 2004/0190601 A1 | 9/2004 | Papadimitriou | 375/148 |
| 2004/0196892 A1 | 10/2004 | Reznik | 375/148 |
| 2004/0264552 A1 | 12/2004 | Smee | 375/148 |
| 2005/0084045 A1 | 4/2005 | Stewart | 375/350 |
| 2005/0111566 A1 | 5/2005 | Park et al. | 375/267 |
| 2005/0129107 A1 | 6/2005 | Park | 375/233 |
| 2005/0163196 A1 | 7/2005 | Currivan et al. | 375/144 |
| 2005/0180364 A1 | 8/2005 | Nagarajan | 370/335 |
| 2005/0223049 A1 | 10/2005 | Regis | 708/319 |
| 2005/0243908 A1 | 11/2005 | Heo | 375/233 |
| 2005/0259770 A1 | 11/2005 | Chen | 375/229 |
| 2006/0007895 A1 | 1/2006 | Coralli | 370/335 |
| 2006/0013289 A1 | 1/2006 | Hwang | 375/346 |

FOREIGN PATENT DOCUMENTS

| | | | |
|---|---|---|---|
| DE | 4343959 | 6/1995 | H04B 7/08 |
| EP | 0558910 | 1/1993 | H04B 1/16 |
| EP | 0610989 | 1/1994 | H04B 7/04 |
| EP | 1179891 | 2/2002 | H04B 1/707 |
| GB | 2280575 | 2/1995 | H04L 27/227 |
| JP | 2000-13360 | 1/2000 | H04J 13/04 |
| WO | WO 93/12590 | 6/1993 | H04B 7/26 |
| WO | WO 01/89107 | 11/2001 | H04B 1/707 |
| WO | WO 02/080432 | 10/2002 | |

OTHER PUBLICATIONS

Lupas, Ruxandra and Verdu, Sergio, "Near-Far Resistance of Multiuser Detectors in Asynchronous Channels," IEEE transactions on Communications, vol. 38, No. 4, Apr. 1990. 13 pages.

Notice of Allowance with Fees due dated Nov. 30, 2010 for U.S. Appl. No. 11/266,928, filed Nov. 4, 2005.

Advisory Action dated Sep. 1, 2010 for U.S. Appl. No. 11/266,928, filed Nov. 4, 2005.

Final Rejection dated Jun. 28, 2010 for U.S. Appl. No. 11/266,928, filed Nov. 4, 2005.

Non-Final Rejection dated Dec. 14, 2009 for U.S. Appl. No. 11/266,928, filed Nov. 4, 2005.

Final Rejection dated Apr. 1, 2009 for U.S. Appl. No. 11/266,928, filed Nov. 4, 2005.

Non-Final Rejection dated Sep. 17, 2008 for U.S. Appl. No. 11/266,928, filed Nov. 4, 2005.

Response dated May 6, 2010 to Non-Final Office Action mailed Dec. 14, 2009 re U.S. Appl. No. 11/266,928. 43 Pages.

Wang, Xiaodong et al., "Space-Time Multiuser Detection in Multipath CDMA Channels", IEEE Transactions on Signal Processing, vol. 47, No. 9, Sep. 1999. 19 Pages.

Marinkovic, Slavica et al., "Space-Time Iterative and Multistage Receiver Structures for CDMA Mobile Communications Systems", IEEE Journal on Selected Areas in Communications, vol. 19, No. 8, Aug. 2001. 11 Pages.

Jayaweera, Sudharman K. et al., "A RAKE-Based Iterative Receiver for Space-Time Block-Coded Multipath CDMA", IEEE Transactions on Signal Processing, vol. 52, No. 3, Mar. 2004. 11 Pages.

Mohamed, Nermin A. et al., "A Low-Complexity Combined Antenna Array and Interference Cancellation DS-CDMA Receiver in Multipath Fading Channels", IEEE Journal on Selected Areas in Communications, vol. 20, No. 2, Feb. 2002. 9 Pages.

Response dated May 13, 2010 to final Office Action mailed Apr. 19, 2010 re U.S. Appl. No. 11/272,411 includes Terminal Disclaimer. 6 Pages.

Notice of Allowance and Fee(s) Due with mail date of May 28, 2010 for U.S. Appl. No. 11/272,411. 7 pages.

Reply Brief dated Jul. 30, 2010 in U.S. Appl. No. 11/233,636. 22 pages.

Scharf, et al., "Matched Subspace Detectors," IEEE Transactions on Signal Processing, vol. 42, No. 8, Aug. 1994. 12 pages.

Price, et al., "A Communication Technique for Multipath Channels," Proceedings to the IRE, vol. 46, The Institute of Radio Engineers, New York, NY, US, 1958. 16 pages.

Schlegel, Christian, Alexander, Paul and Roy, Sumit, "Coded Asynchronous CDMA and Its Efficient Detection," IEEE Transactions on Information Theory, vol. 44, No. 7, Nov. 1998. 11 pages.

(56) References Cited

OTHER PUBLICATIONS

Xie, Zhenhua; Short, Robert T. and Rushforth, Craig K., "A Family of Suboptimum Detectors for Coherent Multiuser Communications," IEEE Journal on Selected Areas in Communications, vol. 8, No. 4, pp. 683-690, May 1990. 8 pages.

Viterbi, Andrew J., "Very Low Rate Convolutional Codes for Maximum Theoretical Performance of Spread-Spectrum Multiple-Access Channels," IEEE Journal on Selected Areas in Communications, vol. 8, No. 4, May 1990. pp. 641-649, 9 pages.

Verdu, Sergio, "Minimum Probability of Error for Asynchronous Gaussian Multiple-Access Channels," IEEE Transactions on Information Theory, vol. IT-32, No. 1, Jan. 1986. 12 pages.

Behrens, Richard T. and Scharf, Louis I., "Signal Processing Applications of Oblique Projection Operators," IEEE Transactions on Signal Processing, vol. 42, No. 6, Jun. 1994, pp. 1413-1424. 12 pages.

Alexander, Paul D., Rasmussen, Lars K., and Schlegel, Christian B., "A Linear Receiver for Coded Multiuser CDMA," IEEE transactions on Communications, vol. 45, No. 5, May 1997. 6 pages.

Schlegel, Christian; Roy, Sumit; Alexander, Paul D.; and Xiang, Zeng-Jun, "Multiuser Projection Receivers," IEEE Journal on Selected Areas in Communications, vol. 14, No. 8, Oct. 1996. 9 pages.

Halper, Christian; Heiss, Michael; and Brasseur, Georg, "Digital-to-Analog Conversion by Pulse-Count Modulation Methods," IEEE Transactions on Instrumentation and Measurement, vol. 45, No. 4, Aug. 1996. 10 pages.

Ortega, J.G.; Janer, C.L.; Quero, J.M.; Franquelo, L.G.; Pinilla, J.; and Serrano, J., "Analog to Digital and Digital to Analog Conversion Based on Stochastic Logic," IEEE 0-7803-3026-9/95, 1995. 5 pages.

Lin, Kun; Zhao, Kan; Chui, Edmund; Krone, Andrew; and Nohrden, Jim; "Digital Filters for High Performance Audio Delta-sigma Analog-to-Digital and Digital-to-Analog Conversions," Proceedings of ICSP 1996, Crystal Semiconductor Corporation, Austin, TX,US, pp. 59-63. 5 pages.

Schlegel, C.B.; Xiang, Z-J.; and Roy, S., "Projection Receiver: A New Efficient Multi-User Detector," IEEE 0-7803-2509-5/95, 1995. 5 pages.

Affes, Sofiene; Hansen, Henrik; and Mermelstein, Paul, "Interference Subspace Rejection: A Framework for Multiuser Detection in Wideband CDMA," IEEE Journal on Selected Areas in Communications, vol. 20, No. 2, Feb. 2002. 16 pages.

Schneider, Kenneth S., "Optimum Detection of Code Division Multiplexed Signals," IEEE Transactions on Aerospace and Electronic Systems, vol. AES-15, No. 1, Jan. 1979. 5 pages.

Mitra, Urbashi, and Poor, H. Vincent, "Adaptive Receiver Algorithms for Near-Far Resistant CDMA," IEEE Transactions on Communications, vol. 43, No. 2/3/4, Feb./Mar./Apr. 1995. 12 pages.

Lupas, Ruxandra and Verdu, Sergio, "Linear Multiuser Detectors for Synchronous Code-Division Multiple-Access Channels," IEEE Transactions on Information Theory, vol. 35, No. 1, Jan. 1989. 14 pages.

Cheng, Unjeng, Hurd, William J., and Statman, Joseph I., "Spread-Spectrum Code Acquisition in the Presence of Doppler Shift and Data Modulation," IEEE Transactions on Communications, vol. 38, No. 2, Feb. 1990. 10 pages.

Behrens, Richard T. and Scharf, Louis L., "Parameter Estimation in the Presence of Low Rank Noise," Proceedings of the Twenty-second Asilomar Conference on signals,systems and Computers, Pacific Grove, C.A,22ACSSC-12/88/0341, pp. 341-344, Maple Press, Nov. 1988. 4 pages.

Iltis, Ronald A. and Mailaender, Laurence, "Multiuser Detection of Quasisynchronous CDMA Signals Using Linear Decorrelators," IEEE Transactions on Communications, vol. 44, No. 11, Nov. 1996. 11 pages.

Duel-Hallen, Alexandra, "Decorrelating Decision-Feedback Multiuser Detector for Synchronous Code-Division Multiple-Access Channel," IEEE Transactions on Communications, vol. 41, No. 2, Feb. 1993. 6 pages.

Schlegel, Christian and Xiang, Zengjun, "A New Projection Receiver for Coded Synchronous Multi-User CDMA Systems," Proceedings, 1995, IEEE International Symposium on Information Theory, p. 318, Sep. 17, 1995. 1 page.

Zheng, Fu-Chun and Barton, Stephen K., "On the Performance of Near-Far Resistant CDMA Detectors in the Presence of Synchronization Errors," IEEE Transactions on Communications, vol. 43, No. 12 (pp. 3037-3045), Dec. 1995. 9 pages.

Mitra, Urbashi and Poor, H. Vincent, "Adaptive Decorrelating Detectors for CDMA Systems," accepted for publication in the Wireless Communications Journal, accepted May 1995. 25 pages.

Response dated Aug. 17, 2010 to the Final Office Action of Jun. 28, 2010, re U.S. Appl. No. 11/266,928. 47 pages.

PCT Notification of Transmittal of International Search Report and Written Opinion of International Searching Authority date of mailing Sep. 21, 2007, re Int'l Application No. PCT/US 06/36018. 10 pages.

Frankel et al., "High-performance photonic analogue-digital converter," Electronic Letters, Dec. 4, 1997, vol. 33, No. 25, pp. 2096-2097. 2 pages.

Stimson, George W., "An Introduction to Airborne Radar," 2nd Edition, SciTech Publishing Inc., Mendham, NJ, US, 1998, pp. 163-176 and 473-491. 40 pages.

Kaplan, Elliott D., Editor, "Understanding GPS—Principles and Applications," Artech House, Norwood MA, 1996, pp. 152-236. (Provided publication missing pp. 83-151 of cited reference.) 46 pages.

Rappaport, Theodore S., Editor, "Wireless Communications—Principles & Practice," Prentice Hall, Upper Saddle River, NJ,US, 1996, pp. 518-533. 14 pages.

Best, Roland E., "Phase-Locked Loops—Design, Simulation, and Applications," 4th edition, McGraw-Hill, 1999. 23 pages.

Garg, Vijay K. and Wilkes, Joseph E., "Wireless and Personal Communications Systems," Prentice Hall PTR, Upper Saddle River, NJ, US, 1996. 45 pages.

Kohno, Ryuji, Imaj, Hideki, and Hatori, Mitsutoshi, "Cancellation techniques of Co-Channel Interference in Asynchronous Spread Spectrum Multiple Access Systems," May 1983, vol. J 56-A, No. 5. 8 pages.

Thomas, John K., "Thesis for the Doctor of Philosophy Degree," UMI Dissertation Services, Ann Arbor, MI,US, Jun. 28, 1996. 117 pages.

Viterbi, Andrew J., "CDMA—Principles of Spread Spectrum Communication," Addison-Wesley Publishing Company, Reading, MA,US, 1995, pp. 11-75 and 179-233. 66 pages.

Behrens, Richard T., "Subspace Signal Processing in Structured Noise," UMI Dissertation Services, Ann Arbor, MI,US, Jun. 30, 1990. 117 pages.

Scharf, Louis L., "Statistical Signal Processing—Detection, Estimation, and Time Series Analysis," Addison-Wesley Publishing Company, 1990 pp. 23-75 and 103-178. 74 pages.

Advisory Action Before the Filing of an Appeal Brief Office Action for reply filed Aug. 17, 2010, dated Sep. 1, 2010, in re U.S. Appl. No. 11/266,928. 2 pages.

Office Action dated May 6, 2007, with mail date of Jun. 28, 2010, re U.S. Appl. No. 11/266,928. 17 pages.

Notice of Allowance and Fees Due with mail date of Nov. 30, 2010 for U.S. Appl. No. 11/266,928 includes excerpt from Response to Final Office Action and Examiner's comments. 21 Pages.

B. Widrow, S. Stearns 'Adaptive Signal Processing', Prentice Hall, Signal Processing Series, 1985.

H. Yan et al, "Parallel Interference Cancellation for Uplink Multirate Overlay CDMA channels", IEEE Trans. Comm. V53,No. 1, Jan. 2005, pp. 152-161.

K. Hooli, et al, "Chip Level Channel Equalization in WCDMA Downlink", EURASIP Journal on Applied Signal Processing 2002:8, pp. 757-770.

J. Winters, "Optimal Combining in Digital Mobile Radio with Co-Channel Interference", IEEE J. Selected Areas in Comm., V. SAC-2, No. 4, Jul. 1984, pp. 528-539.

M. Ali-Hackl, et. al, "Error Vector Magnitude as a Figure of Merit for CDMA Receiver Design", The Fifth European Wireless Conference Feb. 24-27, 2004.

(56) References Cited

OTHER PUBLICATIONS

D. Athanasios et. al, "SNR Estimation Algorithms in AWGN for Hiper LAN/2 Transceiver", MWCN 2005 Morocco, Sep. 19-21, 2005.
D.Divsalar, "Improved Parallel Interference Cancellation for CDMA", IEEE Trans. Comm., V46, No. 2, Feb. 1998, pp. 258-268.
T.Lim, S.Roy, "Adaptive Filters in Multiuser (MU) CDMA detection," Wireless Networks 4 (1998) pp. 307-318.
D.Guo,et. al, "A Matrix-Algebraic Approach to Linear Parallel Interference Cancellation in CDMA" IEEE Trans. Comm., V. 48, No. 1, Jan. 2000, pp. 152-161.
L. Rasmussen, et. al, "A Matrix-Algebraic Approach to Successive Interference Cancellation in CDMA" IEEE J. Selected Areas Comm. V. 48, No. 1, Jan. 2000, pp. 145-151.
D.Guo, et. al, "Linear Parallel Interference Cancellation in Long Code CDMA—Multiuser Detection" IEEE J. Selected Areas Comm. V.17, No. 12, Dec. 1999, pp. 2074-2081.
G. Xue, et. al, "Adaptive Multistage Parallel Interference Cancellation for CDMA" IEEE J. Selected Areas Comm. V.17, No. 10, Oct. 1999, pp. 1815-1827.
Y. Guo ,"Advance MIMO-CDMA receiver for Interference Suppression: Algorithms, Systems-on-Chips Architectures and Design Methodology," Doctoral Thesis, Rice University, May 2005, pp. 165-180.
J. Robler, et. al, "Matching-Filter and MMSE Based Iterative Equalization with Soft Feedback, for QPSK Transmission", International Zurich Seminar on Broadband Communication (IZS 2002) pp. 19-1-19-6, Feb. 2002.
H. Dai, et al, "Iterative Space-Time Processing for Multiuser Detection in Multipath CDMA Channels", IEEE Trans. Signal Proc., V.50, No. 9, Sep. 2002, pp. 2116-2127.
A. Yener, et. al, "CDMA Multiuser Detection : A Non-Linear Programming Approach", IEEE Trans. Comm., V. 50, No. 6, Jun. 2002, pp. 1016-1024.
A .Persson, et. al, "Time Frequency Localized CDMA for Downlink Multicarrier Systems", 2002 $7^{th}$ Int. Symp. Spread Spectrum, V. 1, 2002, pp. 118-122.
D. Brown, et. al, "On the Performance of Linear Parallel Interference Cancellation" IEEE Trans Information Theory, V. 47, No. 5, Jul. 2001, pp. 1957-1970.
M. Kobayashi, et. al, "Successive Interference Cancellation with SISO Decoding and EM Channel Estimation," IEEE J. Selected Areas Comm. V. 19, No. 8, Aug. 2001, pp. 1450-1460.
Notice of Allowance with Fees due dated Nov. 30, 2010 for U.S. Appl. No. 11/266,926, filed Nov. 4, 2005.
Advisory Action dated Sep. 1, 2010 for U.S. Appl. No. 11/266,926, filed Nov. 4, 2005.
Final Rejection dated Jun. 28, 2010 for U.S. Appl. No. 11/266,926, filed Nov. 4, 2005.
Non-Final Rejection dated Dec. 14, 2009 for U.S. Appl. No. 11/266,926, filed Nov. 4, 2005.
Final Rejection dated Apr. 1, 2009 for U.S. Appl. No. 11/266,926, filed Nov. 4, 2005.
Non-Final Rejection dated Sep. 17, 2008 for U.S. Appl. No. 11/266,926, filed Nov. 4, 2005.
H.Yan et. al, "Parallel Interference Cancellation for Uplink Multirate Overlay CDMA Channels," IEEE Trans. Comm, V 53, No. 1, Jan. 2005, pp. 152-161.
K.Hooli, et. al, "Chip-Level Channel Equalization in WCDMA Downlink," EURASIP Journal on Applied Signal Processing 2002:8, pp. 757-770.
J.Winters, "Optimal Combining in Digital Mobile Radio with Cochannel Interference," IEEE J. Selected Areas in Comm., V SAC-2, No. 4, Jul. 1984, pp. 528-539.
M.Ali-Hackl, et. al, "Error Vector Magnitude as a Figure of Merit for CDMA Receiver Design," The Fifth European Wireless Conference, Feb. 24-27, 2004.
D. Athanasios, et al, "SNR Estimation Algorithms in AWGN for HiperLAN/2 Transceiver," MWCN 2005 Morocco, Sep. 19-21, 2005.
D.Divsalar, "Improved Parallel Interference Cancellation for CDMA," IEEE Trans. Comm., V 46, No. 2, Feb. 1998, pp. 258-268.
T.Lim,S.Roy, "Adaptive filters in multiuser (MU) CDMA detection," Wireless Networks 4 (1998) pp. 307-318.
D.Guo, et. al, "A Matrix-Algebraic Approach to Linear Parallel Interference Cancellation in CDMA," IEEE Trans Comm, V. 48, No. 1, Jan. 2000, pp. 152-161.
L.Rasmussen, et. al, "A Matrix-Algebraic Approach to Successive Interference Cancellation in CDMA," IEEE Trans Comm, V. 48, No. 1, Jan. 2000, pp. 145-151.
D.Guo, et. al, "Linear Parallel Interference Cancellation in Long-Code CDMA Multiuser Detection," IEEE J. Sel. Areas Comm., V. 17, No. 12, Dec. 1999, pp. 2074-2081.
G.Xue, et. al, "Adaptive Multistage Parallel Interference Cancellation for CDMA," IEEE Journal on Selected Areas in Communications, V. 17, No. 10, Oct. 1999, pp. 1815-1827.
Y.Guo, "Advanced MIMO-CDMA Receiver for Interference Suppression: Algorithms, System-on-Chip Architectures and Design Methodology," Doctoral Thesis, Rice University, May 2005, pp. 165-180.
J.Robler, et. al, "Matched-Filter- and MMSE-Based Iterative Equalization with Soft Feedback for QPSK Transmission," International Zurich Seminar on Broadband Communications (IZS '02) pp. 19-1-19-6, Feb. 2002.
H.Dai, et. al, "Iterative Space-Time Processing for Multiuser Detection in Multipath CDMA Channels," IEEE Trans. Signal Proc., V. 50, No. 9, Sep. 2002, pp. 2116-2127.
A. Yener, et. al, "CDMA Multiuser Detection: A Nonlinear Programming Approach," IEEE Trans. Comm, V. 50, No. 6, Jun. 2002, pp. 1016-1024.
A.Persson, et. al, "Time-Frequency Localized CDMA for Downlink Multi-Carrier Systems," 2002 IEEE 7th Int. Symp. Spread Spectrum, V. 1, 2002, pp. 118-122.
D. Brown, et. al, "On the Performance of Linear Parallel Interference Cancellation," IEEE Trans. Information Theory, V. 47, No. 5, Jul. 2001, pp. 1957-1970.
M. Kobayashi, et. al, "Successive Interference Cancellation with SISO Decoding and EM Channel Estimation," IEEE J. Sel. Areas Comm., V. 19, No. 8, Aug. 2001, pp. 1450-1460.
PCT, Written Opinion of the International Searching Authority, in Application No. PCT/US06/36207, dated Apr. 18, 2007 (5 pages).

\* cited by examiner

INTERFERENCE SUPPRESSION FOR CDMA SYSTEMS

CROSS-REFERENCE TO RELATED APPLICATIONS

This application is a continuation of U.S. patent application Ser. No. 12/966,953, filed Dec. 13, 2010, which is a continuation of U.S. patent application Ser. No. 11/266,928, entitled "Soft Weighted Interference Cancellation for CDMA Systems," filed Nov. 4, 2005, and published as U.S. Patent Application Publication Number 2006-0227854 A1; which is a Continuation-in-Part of (1) U.S. patent application Ser. No. 11/233,636, entitled "Optimal Feedback Weighting for Soft-Decision Cancellers," filed Sep. 23, 2005, and published as U.S. Patent Application Publication Number 2006-0227909 A1; and (2) U.S. patent application Ser. No. 11/100,935, entitled "Construction of Projection Operators for Interference Cancellation," filed Apr. 7, 2005, and published as U.S. Patent Application Publication Number 2005-0180364 A1, which is a Continuation-in-Part of (a) U.S. patent application Ser. No. 11/773,777, entitled "Systems and Methods for Parallel Signal Cancellation," and filed on Feb. 6, 2004, now U.S. Pat. No. 7,394,879; (b) U.S. patent application Ser. No. 10/686,359, entitled "Systems and Methods for Adjusting Phase," and filed Oct. 15, 2003, now U.S. Pat. No. 7,068,706; (c) U.S. patent application Ser. No. 10/686,829, entitled "Method and Apparatus for Channel Amplitude Estimation and Interference Vector Construction," and filed on Oct. 15, 2003, now U.S. Pat. No. 7,580,448; (d) U.S. patent application Ser. No. 10/294,834, entitled "Construction of an Interference Matrix for a Coded Signal Processing Engine," and filed on Nov. 15, 2002, now U.S. Pat. No. 7,200,183; and (e) U.S. patent application Ser. No. 10/247,836, entitled "Serial Cancellation Receiver Design for a Coded Signal Processing Engine," and filed on Sep. 20, 2002, now U.S. Pat. No. 7,158,559. The entirety of each of the foregoing patents, patent applications, and patent application publications is incorporated by reference herein.

BACKGROUND

1. Field of the Invention

The present invention relates generally to interference cancellation in received wireless communication signals and, more particularly, to forming a composite interference signal for interference cancellation.

2. Discussion of the Related Art

In an exemplary wireless multiple-access system, a communication resource is divided into subchannels and allocated to different users. For example, subchannels may include time slots, frequency slots, multiple-access codes, spatio-temporal subchannels, or any combination thereof. A plurality of subchannel signals received by a wireless terminal (e.g., a subscriber unit or a base station) may correspond to different users and/or different subchannels allocated to a particular user. In some systems, a plurality of subchannels may be allocated to at least one user such that the number of users is less than the number of subchannels.

If a single transmitter broadcasts different messages to different receivers, such as a base station in a wireless communication system broadcasting to a plurality of mobile terminals, the channel resource is subdivided in order to distinguish between messages intended for each mobile. Thus, each mobile terminal, by knowing its allocated subchannel(s), may decode messages intended for it from the superposition of received signals. Similarly, a base station typically separates signals it receives into PN-coded subchannels in order to differentiate between users.

In a multipath environment, received signals are superpositions of time delayed (and complex scaled) versions of the transmitted signals. Multipath can cause co-channel and cross-channel interference that correlates, the allocated subchannels. For example, co-channel interference may occur when time-delayed reflections of transmitted signals interfere with a line-of-sight signal from the same source. Cross-channel interference occurs when signals in a subchannel leak into and, thus, impair acquisition and tracking of other subchannels.

Co-channel and cross-channel interference can degrade communications by causing a receiver to incorrectly decode received transmissions, thus increasing a receiver's error floor. Interference may also have other degrading effects on communications. For example, interference may diminish the capacity of a communication system, decrease the region of coverage, and/or decrease maximum data rates. For these reasons, a reduction in interference can improve reception of selected signals by addressing the aforementioned limitations due to interference.

SUMMARY OF THE INVENTION

In view of the foregoing background, embodiments of the present invention may provide for identifying interference components for the purpose of forming a composite interference signal for use in any subtractive or projective interference canceller. The identification of interference components and the cancellation of such components may be implemented using a parallel, serial, iterative, or one-shot mode of operation.

Embodiments of the invention may be employed in any receiver configured to support one or more CDMA standards, such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the WCDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 CDMA2000 High Rate Packet Data Air Interface Specification" (the CDMA2000 standard), and (5) other CDMA standards.

Embodiments of the invention may provide for analytically characterizing the received signal-to-interference-and-noise ratio (SINR), estimating it in a composite signal or in an interfering user subchannel, and choosing feedback terms (e.g., adaptive weights from a companding function) to construct an interference-cancelled signal that maximizes this quantity. In one embodiment of the invention, a means for determining an SINR estimate in each subchannel uses an estimated SINR for each estimated symbol. In this case, each estimated symbol may be generated by a means for producing symbol estimates from a received baseband signal. Alternatively, symbol estimates may include resolutions of the baseband signal into multiple antenna copies, multipath components, or the like. A means for determining whether to use weighted soft decisions or hard decisions for each subchannel compares each subchannel's SINR estimate to a predetermined threshold. A means for generating hard decisions and/or weighted soft decisions for each symbol estimate produces either a hard estimate or a weighted soft estimate for each symbol estimate based on how the corresponding SINR estimate compares to the threshold. A means for producing a synthesized interference signal may synthesize a composite interference vector from the hard or soft-weighted symbol estimates. A means for emulating channel distortions in the synthesized interference signal may simulate channel effects corresponding to paths other than a predetermined path of interest. A means for producing an interference-cancelled signal combines a received baseband signal with the synthesized interference signal in order to subtract or project out interference in the received baseband signal, or in one or more rake-resolved components of the baseband signal.

The means for producing symbol estimates corresponding to a received baseband signal may include, by way of example, a rake receiver, a plurality of rake receivers coupled to a rake combiner, an equalizer, and/or any CDMA receiver employing antenna diversity, equalizers, and/or other elements of an advanced receiver.

The means for determining an SINR estimate in each subchannel may include, by way of example, an apparatus or method configured for filtering complex amplitudes and estimated variances of the complex amplitudes for each subchannel. The means for determining an SINR estimate may include an apparatus or process configured for calculating a mean-squared error due to noise plus interference or a component or method for computing a broadband noise plus interference floor.

The means for determining whether to use weighted soft decisions or hard decisions for each subchannel may include, by way of example, any apparatus or method configured for comparing estimated SINRs to at least one predetermined threshold.

The means for generating hard decisions and/or weighted soft decisions for each pre-processed symbol estimate may include, by way of example, an apparatus or method for generating hard decisions, an apparatus or method for generating weights on soft estimates, and/or an apparatus or method for discarding soft estimates with a low estimated SINR.

The means for producing a synthesized interference signal may include, by way of example, a CDMA signal generator configured for performing an inverse fast Walsh transform (IFWT), PN covering, pulse shaping, and channel emulation.

The means for emulating channel distortions may include, by way of example, an apparatus or method configured for convolving the synthesized interference signal with a channel profile, which in some cases, excludes channel effects corresponding to one or more predetermined paths or rake fingers of interest.

The means for producing an interference-cancelled signal may include, by way of example, a subtractive canceller, a weighted subtractive canceller, a projective canceller, and/or a weighted projective canceller.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Various functional elements, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

These and other embodiments of the invention are described with respect to the figures and the following description of the preferred embodiments.

BRIEF DESCRIPTION OF THE DRAWINGS

Embodiments according to the present invention are understood with reference to the schematic block diagrams of FIGS. 1, 2A, and 2B, and the flow diagrams of FIGS. 3, 4A, and 4B. Various functional units depicted in the figures may take the form of a microprocessor, digital signal processor, application specific integrated circuit, field programmable gate array, or other logic circuitry programmed or otherwise configured to operate as described herein. Accordingly, embodiments shown herein may take the form of programmable features executed by a common processor or a discrete hardware unit.

DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
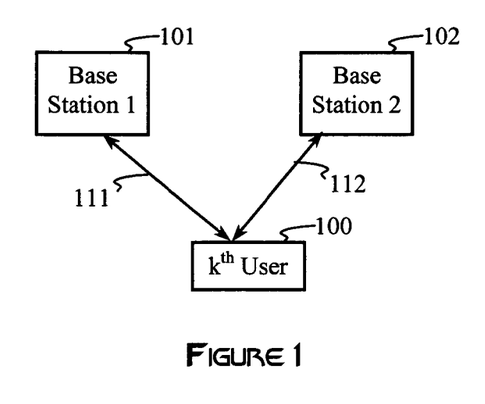
FIG. 1 is a system diagram illustrating a communication system configuration in which embodiments of the present invention may be configured to operate.

FIG. 1 shows an exemplary CDMA system configuration for the purpose of illustrating embodiments of the invention configured to perform soft-weighted subtractive cancellation. In the present example, a $k^{th}$ user terminal 100 receives communications from sources (e.g., base stations) 101 and 102 via signal paths 111 and 112, respectively. In an alternative embodiment not shown, the sources 101 and 102 may correspond to two propagation paths from one base station. The sources 101 and 102 employ orthogonalizing (e.g., Walsh) codes $W_j$ with PN/Scrambling code covers $P_j$ where j=1 or 2. The orthogonalizing codes spread the symbol transmission by a factor of N.

A data symbol for a $k^{th}$ user of a $j^{th}$ base-station may be represented by $a_{jk}$. A received signal r[n] at the $k^{th}$ user terminal 100 for an $n^{th}$ chip and a symbol duration that spans N chips is expressed by $$r[n] = c_1 P_1[n] \sum_{k=1}^{K_1} W_{1k}[n] a_{1k}[l] + c_2 P_2[n] \sum_{k=1}^{K_2} W_{2k}[n] a_{2k}[l] + u[n],$$

$$lN \le n \le (l+1)N - 1$$

where $W_{jk}[n]$ denotes the $n^{th}$ chip of the $k^{th}$ user from the $j^{th}$ source, and u[n] is additive white Gaussian noise of variance $\sigma_u^2$. Although this exemplary embodiment excludes pulseshape filtering effects, alternative embodiments that consider pulse shaping may be provided. The variables $K_1$ and $K_2$ denote the number of user channels multiplexed by the $1^{st}$ and $2^{nd}$ transmit sources, respectively. If both sources correspond to the same base station, then $K_1 = K_2$. The values $c_j$ are complex channel gains corresponding to the signal from the $j^{th}$ base station to the receiver. Although a single path per base station is described, embodiments of the invention may be configured to account for multiple paths from each base station.

If the first base station 101 transmits a signal of interest, then transmissions from the second base station 102 may comprise interference. Interference cancellation, such as subtractive and/or projective cancellation may be employed. According to one aspect of the present invention, a receiver may synthesize interference from a combination of soft-weighted and hard-coded pre-processed symbol estimates. A synthesized interference signal $s_2[n]$ corresponding to the second base station 102 may be expressed by $$s_2[n] = c_2 P_2[n] \sum_{k=1}^{K_2} W_{2k}[n] \lambda_{2k}(\tilde{a}_{2k}[l]) \tilde{a}_{2k}[l], \quad lN \le n \le (l+1)N - 1$$

where $\tilde{a}_{2k}[l]$ is a pre-processed soft estimate of a $k^{th}$ user's symbol on symbol period l, and $\lambda_{2k}(\tilde{a}_{2k}[l])$ is a companding function acting on the estimated symbol $\tilde{a}_{2k}[l]$. Although the expression for the synthesized interference $s_2[n]$ may assume perfect channel estimates $c_2$, uncertainty in the channel estimates may be factored into the functions $\lambda_{2k}(\tilde{a}_{2k}[l])$. The receiver may subtract the synthesized interference $s_2[n]$ from the received signal r[n]. An interference-cancelled version of the first path 111, $\hat{r}_1$, is given by $$\hat{r}_1[n] = r[n] - s_2[n] = c_1 P_1[n] \sum_{k=1}^{K_1} W_{1k}[n] a_{1k}[l] +$$

$$c_2 P_2[n] \sum_{k=1}^{K_2} W_{2k}[n] (a_{2k}[l] - \lambda_{2k}(\tilde{a}_{2k}[l]) \tilde{a}_{2k}[l]) + u[n]$$

Each chip of a corresponding PN-stripped output $x_1[n]$ is given by $$x_1[n] = P_1^*[n] \hat{r}_1[n] = c_1 \sum_{k=1}^{K_1} W_{1k}[n] a_{1k}[l] +$$

$$c_2 P_1^*[n] P_2[n] \sum_{k=1}^{K_2} W_{2k}[n] (a_{2k}[l] - \lambda_{2k}(\tilde{a}_{2k}[l]) \tilde{a}_{2k}[l]) + P_1^*[n] u[n]$$

where * denotes a complex conjugate and the identity $P_1^*[n] P_1[n] = 1$ is enforced. This step is followed by matching to an $m^{th}$ code for a user of interest. The result of this operation, $\hat{a}_{1m}$, is $$\hat{a}_{1m}[l] = \sum_{n=1}^{N} W_{1m}^*[n] x_1[n] =$$

$$c_1 a_{1m}[l] + c_2 \sum_{k=1}^{K_2} \rho_{mk} (a_{2k}[l] - \lambda_{2k}(\tilde{a}_{2k}[l]) \tilde{a}_{2k}[l]) + \sum_{n=1}^{N} W_{1m}^*[n] P_1^*[n] u[n]$$

where the orthogonality $$\sum_{n=1}^{N} W_{1m}^*[n] W_{1k}[n] = \delta_{mk}$$

has been enforced, and $\rho_{mk}$ is the correlation between the $m^{th}$ code of the first base station 101 and the $k^{th}$ code of the second base station 102 that includes the effects of the PN covers:

$$\rho_{mk} = \sum_{n=1}^{N} W_{1m}^*[n] P_1^*[n] P_2[n] W_{2k}[n]$$

Symbol estimates $\tilde{a}_{1m}[l]$ for the $m^{th}$ user signal from the first base station 101 are $$\tilde{a}_{1m}[l] = c_1^* \hat{a}_{1m}[l] = |c_1|^2 a_{1m}[l] +$$

$$c_1^* c_2 \sum_{k=1}^{K_2} \rho_{mk} (a_{2k}[l] - \lambda_{2k}(\tilde{a}_{2k}[l]) \tilde{a}_{2k}[l]) + c_1^* \sum_{n=1}^{N} W_{1m}^*[n] P_1^*[n] u[n]$$

The post-processed SINR for user m is given by $$SINR_m = \frac{E_{1m} |c_1|^4}{|c_1^* c_2|^2 \sum_{k=1}^{K_2} E|\rho_{mk}|^2 E|a_{2k} - \lambda_{2k}(\tilde{a}_{2k}) \tilde{a}_{2k}|^2 + |c_1|^2 \sigma_w^2}$$

where the noise $$w[l] = \sum_{n=1}^{N} W_{1m}^*[n] P_1^*[n] u[n]$$

is modeled as a complex random variable with zero mean and variance $\sigma_w^2$, and $E_{1m}$ is the expected value of $|a_{1m}|^2$.

The post-processed SINR is maximized by minimizing the expectation terms per subchannel (e.g. Walsh channel). This is accomplished by decomposing the function $\lambda_{2k}(\tilde{a}_{2k})$ into its real and imaginary components and differentiating with respect to each component. The minimizing function is the real scalar weighting $\lambda_{2k}\tilde{a}_{2k}$.

The symbol estimates $\tilde{a}_{2k}$ may be assumed to be uncorrelated symbol estimates, which have mean $\tilde{a}_{2k}$ and variance $\sigma_{2k}^2$. The post-processed $SINR_m$ for a particular subchannel m may be maximized by selecting weights for the other subchannels as $$\lambda_{2k} = \frac{E_{2k}}{E_{2k} + \sigma_{2k}^2} = \frac{E_{2k}}{E|\tilde{a}_{2k}|^2} = \frac{E|\tilde{a}_{2k}|^2 - \sigma_{2k}^2}{E|\tilde{a}_{2k}|^2} = \frac{SINR_{2k}^{(1)}}{SINR_{2k}^{(1)} + 1}$$

where $E_{2k} = E|a_{2k}|^2$ is the average energy of subchannel k for source 2, $E|\tilde{a}_{2k}|^2 = E_{2k} + \sigma_{2k}^2$, and $$SINR_{2k}^{(1)} = \frac{E_{2k}}{\sigma_{2k}^2}$$

is the pre-processed SINR. If $E_{2k}$ is known, the soft weight $\lambda_{2k}$ may be estimated as $$\lambda_{2k} = \frac{E_{2k}}{avg(|\tilde{a}_{2k}|^2)}$$

where avg(.) denotes an average of the variable (.) over a sequence of symbol transmissions. This average may be quite general, and it may be based on prior knowledge or probability models for $E_{2k}$ and/or $\sigma_{2k}^k$.

If $E_{2k}$ is unknown and $\sigma_{2k}^2$ is known, then $\lambda_{2k}$ may be estimated as $$\hat{\lambda}_{2k} = \max\left(0, \frac{avg(|\tilde{a}_{2k}|^2) - \sigma_{2k}^2}{avg(|\tilde{a}_{2k}|^2)}\right)$$

If $\hat{\lambda}_{2k}$ is quantized to zero or one, such as for selecting active subchannels, then $\hat{\lambda}_{2k}$ is $$\hat{\lambda}_{2k} = \begin{cases} 1, & \frac{avg(|\tilde{a}_{2k}|^2)}{\sigma_{2k}^2} > z \\ 0, & \text{otherwise} \end{cases}$$

where z is a predetermined threshold value. In one embodiment of the invention, the threshold value z=2 may be used.

If neither $E_{2k}$ nor $\sigma_{2k}^2$ is known, then $\sigma_{2k}^2$ may be estimated from another subchannel having a common value $\sigma_{2m}^2 = \sigma_{2k}^2$ known $E_{2m}$, and known symbols. Then $\lambda_{2k}$ may be estimated as $$\hat{\lambda}_{2k} = \max\left(0, \frac{avg(|\tilde{a}_{2k}|^2) - avg(\tilde{\sigma}_{2k}^2)}{avg(|\tilde{a}_{2k}|^2)}\right)$$

or with a corresponding quantized version. In some cases, $avg(\sigma_{2k}^2)$ can be obtained from $avg(\tilde{\sigma}_{2k}^k)$ as an estimate of $\sigma_{2m}^2 = E|\tilde{a}_{2m} - \sqrt{E_{2m}} a_{2m}|^2$, where $a_{2m}$ is a known symbol on a pilot channel. Similarly, other channels having known values of $a_{2m}$ and $\sqrt{E_{2m}}$ may be used.

If there is prior information about the distribution of $E_{2k}$, then $\lambda_{2k}$ may be estimated as the posterior mean, given a sequence of symbol estimates $\{\tilde{a}_{2k}[l], l=1, 2, \ldots, L\}$:

$$\hat{\lambda}_{2k} = E[\lambda_{2k}||\tilde{a}_{2k}|^2[l], l=1, 2, \ldots, L]$$

The expectation is over the posterior distribution of $E_{2k}$, given the sequence $\{\tilde{a}_{2k}[l]\}$. When the posterior mean is intractable to compute, it may be numerically approximated to produce estimates of $\lambda_{2k} = E|\tilde{a}_{2k}|^2/(E|\tilde{a}_{2k}|^2 + \sigma_{2k}^2)$ that are companded versions of $|\tilde{a}_{2k}|^2/(|\tilde{a}_{2k}|^2 + \sigma_{2k}^2)$ or companded versions of $(|\tilde{a}_{2k}|^2 - \sigma_{2k}^2)/|\tilde{a}_{2k}|^2$.

In some embodiments, hard decisions may be made for the pre-processed symbol estimates when $\lambda_{2k}$ exceeds a predetermined threshold. The derivation for the SINR in such embodiments is described in the co-pending application, entitled "Soft-weighted subtractive interference cancellation systems," which is hereby incorporated by reference.

Some embodiments may employ weighted soft decisions on some subchannels and hard decisions on others. In one such embodiment, all subchannels having a preprocessed $SINR^{(1)}$ between two predetermined thresholds employ soft weighted (e.g., companded) estimates for interference synthesis. Subchannels having values of $SINR^{(1)}$ below the lower threshold may be zeroed. Subchannels having values of $SINR^{(1)}$ above the upper threshold may be hard-coded to a nearest constellation point (i.e., hard decisions are used). A CDMA2000 system in which symbols are drawn from a single QPSK constellation may use a combination of soft and hard decisions based on predetermined thresholds. However, in a system where W-CDMA and HSDPA coexist, constellations for various users may differ. Thus, the constellations of interfering users are typically unknown at the receiver, making hard decisions impractical, unless constellation classification is performed per user. However, the estimation of $E_{2k} + \sigma_{2k}^2$ remains unchanged. Other embodiments may quantize the weighting of soft estimates.

Figure 2A:
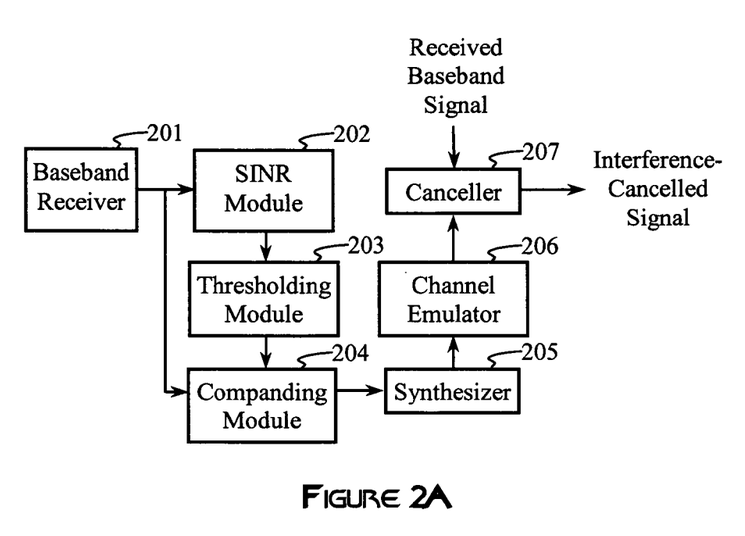
FIG. 2A is a block diagram of an interference-cancelling circuit, which may be configured for removing interference from a predetermined multipath component.

FIG. 2A is a block diagram that shows a receiver embodiment of the invention that may be employed in a CDMA system. The receiver includes a baseband receiver 201 coupled to an SINR-estimation module 202 and a companding module 204. A thresholding module 203 is coupled between the SINR-estimation module 202 and the companding module 204. The companding module 204 is coupled to an interference synthesizer 205, followed by a channel emulator 206, and a canceller 207.

The baseband receiver 201 provides pre-processed symbol estimates for subchannels of a received baseband signal. For example, a rake receiver may be employed for producing pre-processed estimates for all of the received CDMA subchannels. In another embodiment, symbol estimates may be chosen per rake finger. In some embodiments, the baseband receiver 201 may comprise an equalizer receiver.

The pre-processed estimates are coupled into the SINR-estimation module 202, which estimates a pre-processed $SINR^{(1)}$ for each subchannel. SINR estimates may be extracted from EVMs. Alternatively, the noise-plus-interference variance may be measured on a representative subchannel (e.g., a pilot channel) and used for all subchannels. The value $avg(\tilde{a}_{2k}^2)$ may be used to estimate $E_{2k} + \sigma_{2k}^2$ directly without resolving onto a constellation.

The thresholding module 203 compares estimated SINR to a predetermined threshold for determining whether soft or hard decisions are to be used for generating interference-symbol estimates for each subchannel. The companding module 204 generates the hard decisions and/or weighted soft decisions for each pre-processed symbol estimate. The companding module 204 may employ filtering for each subchannel to estimate user amplitudes, and amplitude scaling may be employed prior to hard decisions. The estimated SINR may be used to generate weights used to soft weight symbol estimates for each subchannel.

The interference synthesizer 205 performs source-specific operations on the symbol estimates (which may be soft and/or hard symbol estimates) to produce a synthesized interference signal. For example the interference synthesizer 205 may perform an Inverse Fast Walsh Transform (IFWT) to respread user symbol estimates, followed by a PN covering that provides for PN/Scrambling cover codes. A transmitter pulse-shaping filter may be used to shape the scrambled, code-multiplexed signal.

The channel emulator 206, which may optionally be part of the interference synthesizer 205, adds channel distortions to the synthesized interference signal. In one embodiment, a path of interest is selected from a multipath signal. For example, the first signal path 111 from base station 101 corresponding to a first finger of a rake receiver may be denoted as the path of interest. In this case, the channel emulator 206 may convolve the synthesized interference with a channel profile that excludes the channel effects corresponding to the first finger (i.e., the first signal path 111). This enables a canceller (e.g., canceller 207) to remove effects of other multipath components from the path of interest (i.e., signal path 111). Receiver embodiments of the invention may be configured to remove any number of multipath components from a path of interest. Furthermore, when multiple transmit sources are present, signals from sources other than the source corresponding to the path of interest may be removed.

The canceller 207 may include a subtractive canceller or a projective canceller configured to remove interference from the received baseband signal, which may be obtained from a receiver pulse-shaping filter (not shown). Thus, the interference synthesizer 205 or the channel emulator 206 may optionally emulate the effects of receiver pulse-shaping for the synthesized interference.

In some embodiments of the invention, the canceller 207 may provide for a scale factor $\alpha$ to adjust the amount of interference that is removed. In some cases, the received signal and the synthesized interference are not to scale. For example, Walsh Codes and PN codes typically are not normalized. Walsh stripping and Walsh insertion together introduce a scale equal to the code length N, and PN code stripping and insertion together introduce an additional factor of 2. Furthermore, MRC combining for M paths results in a scaling factor given by $$\eta = \sum_{i=1}^{M} |b_i|^2$$

where $b_i$ is a weighting factor employed for an $i^{th}$ finger. For example, $|b_i|^2 = |c_i|^2$ or $|b_i|^2 = |c_i|^2/\sigma^2$. The normalizing factor in this case is $$\alpha = \frac{1}{2N\eta},$$

and the interference-cancelled signal is given by $$r_c = r - \alpha s$$

The term $\alpha$ may also represent a projective cancellation factor that accounts for path correlations. An example of $\alpha$ for such a case is given by $$\alpha s = P_s r, \ \alpha = \frac{s^H r}{s^H s}$$

Where $P_s$ is a projection operator $P_s = ss^H/s^H s$.

Interference-cancelled signals output by the canceller 207 may be coupled to one or more rake fingers. In an exemplary rake receiver configured to process four multipath components, interference-cancelled signals in which the effects of a third and a fourth path are removed may be coupled to fingers configured for processing first and second multipath components. A comparator (not shown) may optionally be employed for selecting one of the interference-cancelled signal and the uncancelled signal for processing by a rake receiver, Embodiments of the invention may be configured for receivers having more than one receive antenna. For example, in FIG. 2B, each of a plurality N of rake receivers 201.1-201.N corresponding to a different receive antenna (not shown) may include an interference canceller 207.1-207.N, respectively. A generalized combiner may be used to combine paths that are common to two or more receive antennas. A combiner 211 may perform maximal ratio combining across the rake 201.1-201.N fingers. Alternative types of combining may be performed. Pre-processed soft estimates are output by the combiner 211 and used to produce synthesized interference, such as described previously. The synthesized interference is coupled to a plurality of channel emulators 206.1-206.N, wherein each channel emulator 206.1-206.N has an associated rake receiver 201.1-201.N.

Figure 2B:
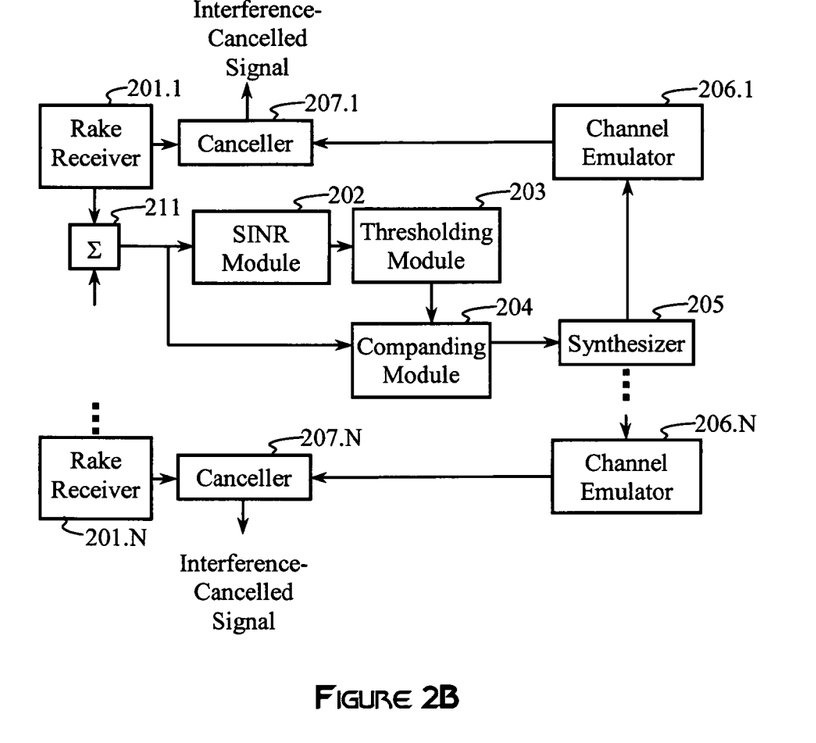
FIG. 2B is a block diagram showing an embodiment of an interference-cancelling circuit configured to cancel interference in a receiver employing antenna diversity.

In an exemplary two-antenna system configured for receiving two multipath components from a single transmit source, a first channel emulator produces two interference signals corresponding to the two paths received by the first antenna. Similarly, a second channel emulator produces two interference signals corresponding to the two paths received by the second antenna. In this case, the receiver may include four rake fingers, each matched to one of the four paths. The first finger may be assigned to the signal received by the first antenna, wherein interference due to the second path is removed via subtractive or projective cancellation. The second finger may be assigned to the signal received by the first antenna wherein the interference due to the first path is removed. Similarly, the third and fourth fingers may be matched to the multipath components received by the second receive antenna.

In "data optimized" CDMA, such as High-Speed Downlink Packet Access (HSDPA), multiple subchannels transmitting high data rates have the same frequency-selective fade and each of these coded subchannels has the same transmission amplitude. These subchannels coexist with voice channels, which have a lower data rate. Unlike the high-rate subchannels, these low-rate channels may have different amplitudes. In such systems, only one weight may be calculated for each of the K subchannels carrying high data rates. Signal amplitudes may be averaged over time and/or across subchannels, and the noise power may also be averaged over subchannels to obtain a single SINR estimate. In one embodiment of the invention, an SINR estimate may be compared to a predetermined threshold for determining whether to perform hard decisions, weighted soft decisions, or zeroing for all of the high data rate subchannels.

Figure 3:
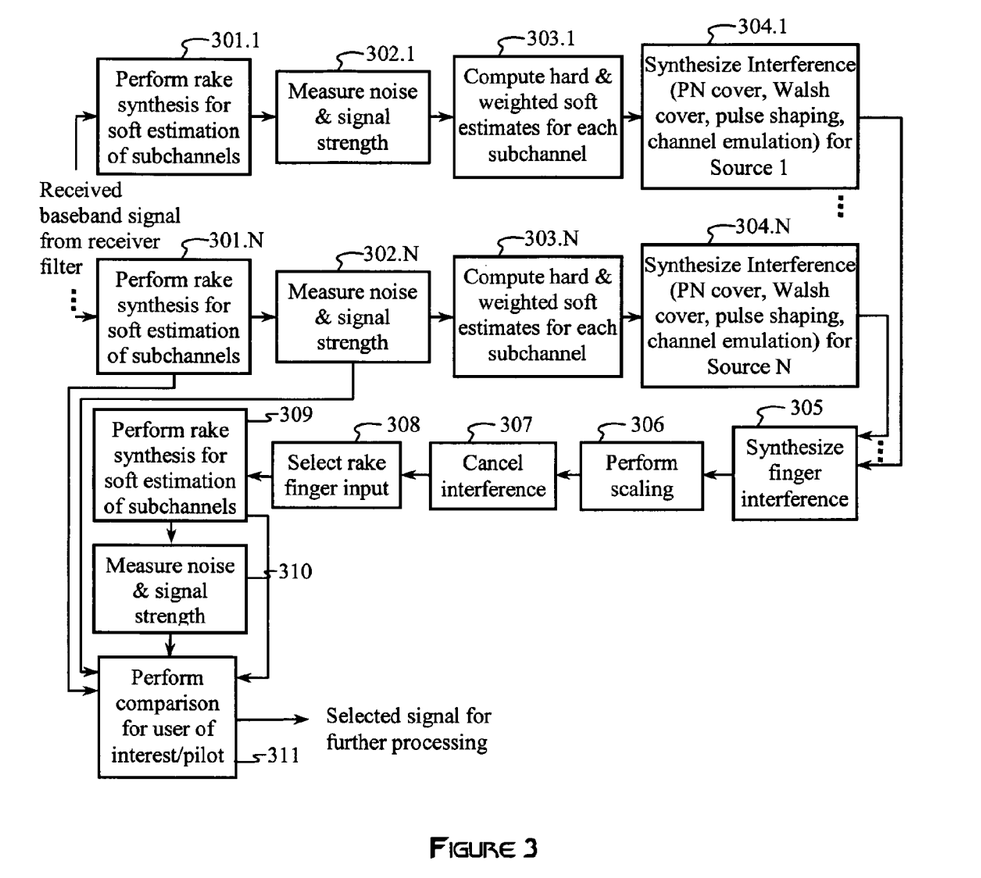
FIG. 3 is a flow chart that illustrates a cancellation method in accordance with an embodiment of the invention.

FIG. 3 is a flow chart that illustrates a cancellation method in accordance with an embodiment of the invention. Rake synthesis 301.1 processes a received baseband signal to produce soft symbol estimates for data symbols modulated on subchannels by a first source (e.g., a first base station). Similarly, rake synthesis 301.N produces soft symbol estimates for data symbols modulated on subchannels by an $N^{th}$ source. The rake synthesis steps 301.1-301.N may optionally be cross-coupled if source diversity is present for at least some of the subchannels, such as may typically occur during a soft hand over. For each source, an SINR estimate or a vector magnitude is made from the soft symbol estimates 302.1-302.N. These measurements are used to determine the reliability of the soft symbol estimates. Based on this reliability determination, either a hard decision or a weighted soft-decision is produced for each soft symbol estimate 303.1-303.N. This companding process 303.1-303.N may implement subchannel selection, such as by discarding subchannels that have a signal energy that falls below a predetermined threshold. Interference synthesis (such as providing for PN covering, Walsh covering, pulse shaping, and channel emulation) 304.1-304.N is performed to synthesize interference received from each source (i.e. each base station and/or multipath).

Interference for a particular rake finger is synthesized 305 using synthesized multipath signals from each of the first source to the $N^{th}$ source. Scaling 306 may optionally be used to scale interference received from the different sources. Some form of interference cancellation 307 (such as subtractive cancellation, weighted subtractive cancellation, projective cancellation, or weighted projective cancellation) is provided for cancelling interference from a predetermined path of interest. Rake finger input selection 308 is performed to select between an interference-cancelled signal and the original received baseband signal (depending on which signal has the highest value of estimated SINR or an alternative figure of merit) prior to coupling the resulting selected signal into a rake finger. Rake synthesis 309 produces soft estimates for each subchannel. Signal and noise powers are measured 310, followed by another selection process 311 configured to select either soft estimates produced by some combination of rake synthesis 301.1 to 301.N or soft estimates produced by rake synthesis 309. The selected signals may be output for further processing.

Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

Figures 4A, 4B:
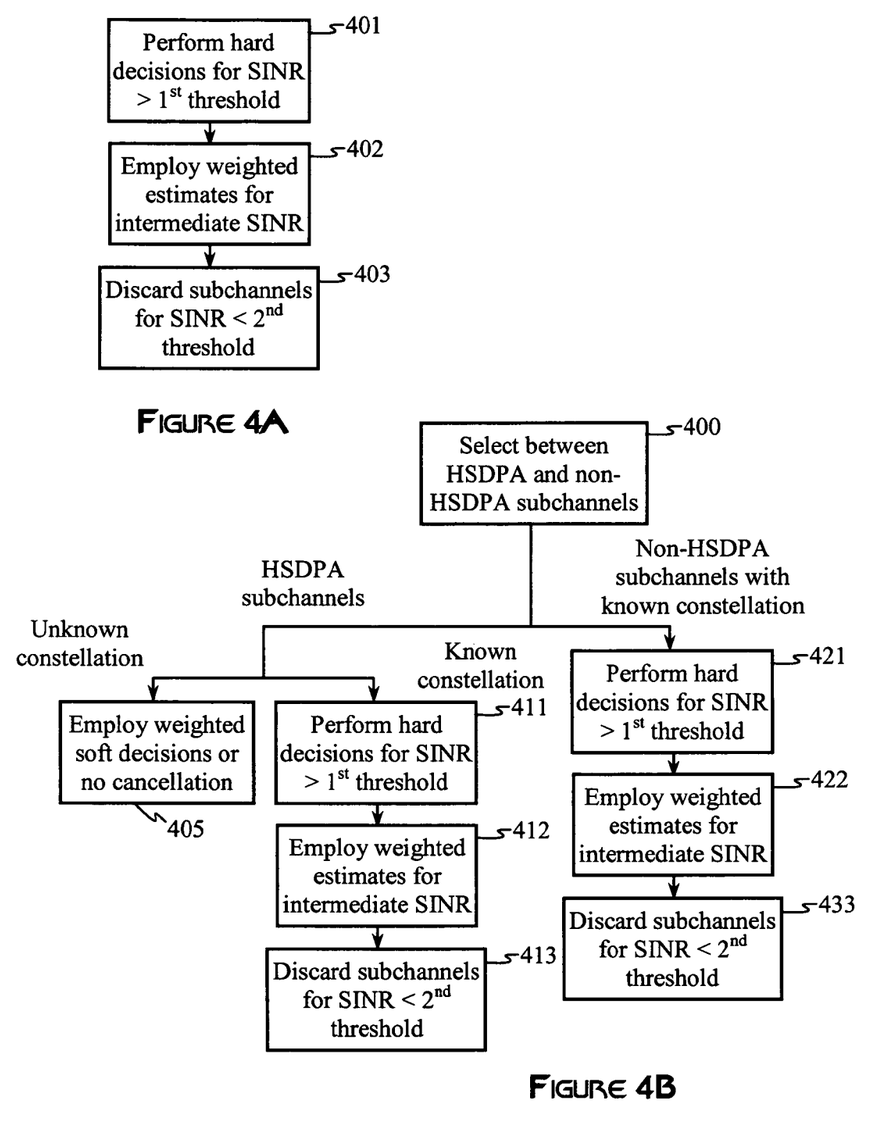
FIG. 4A illustrates a method for estimating subchannel symbols as part of an interference-cancellation technique.
FIG. 4B illustrates a method for estimating subchannel symbols for a system (e.g., an HSDPA system) that employs different signal constellations and spreading codes for different data rates.

FIG. 4A illustrates a method for estimating subchannel symbols as part of an interference-cancellation technique. For a given pre-processed SINR, hard decisions are employed if the SINR is higher than a first predetermined threshold 401. Weighted soft decisions may be employed for an intermediate range of SINRs defined by an upper bound (e.g., the first predetermined threshold) and a lower bound 402 (e.g., a second predetermined threshold). Subchannel symbol values may be discarded (e.g., set to zero) if the pre-processed SINR falls below the second predetermined threshold 403. In a related embodiment, an interference cancellation circuit may be turned off if the measured SINR falls below a predetermined threshold, since, in some embodiments of the invention, it is known that interference cancellation may not be as useful as power conservation at lower pre-processed SINRs.

FIG. 4B illustrates a method for estimating subchannel symbols for a given system that employs different signal constellations corresponding to different data rates. A system identification 400 is performed for each subchannel. For example, system identification 400 may distinguish between HSDPA subchannels and non-HSDPA subchannels, which have a lower data rate. For subchannels (e.g., HSDPA subchannels) having a higher data rate, some predetermined strategy may be used to estimate subchannel symbols based on whether the symbol constellation for those subchannels is known or unknown. Weighted soft estimates may be employed or cancellation may be bypassed for HSDPA subchannels in which the constellation is unknown. If the constellation is known, hard decisions 411, weighted soft decisions 412, and/or no cancellation 413 may be performed. For non-HSDPA (e.g., WCDMA) subchannels, it is assumed that the constellation is known. Thus, hard decisions 421, weighted soft decisions 422, and/or no cancellation 423 may be performed.

The functions of the various elements shown in the drawings, including functional blocks labeled as "modules" may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

We claim:

1. A receiver for receiving a multipath signal, the receiver comprising:
    a signal-to-interference-and-noise ratio (SINR) estimation module in the receiver, the SINR estimation module configured to produce a plurality of pre-processed SINR estimates corresponding to a plurality of pre-processed symbol estimates from the multipath signal; and
    a thresholding module configured to compare each of the plurality of pre-processed SINR estimates to a predetermined threshold to determine whether to employ a weighted soft decision or a hard decision, wherein the weighted soft decision is determined according to a companding function that compresses at least one of the plurality of pre-processed SINR estimates.

2. The receiver of claim 1, wherein the SINR estimation module is configured to produce the plurality of pre-processed SINR estimates by averaging symbol amplitudes over at least one of a set of parameters, the set of parameters including time and a plurality of subchannels.

3. The receiver of claim 1, wherein the thresholding module is configured to determine an estimated SINR below which weighted soft decisions provide better performance than hard decisions, and above which hard decisions provide better performance than weighted soft decisions.

4. The receiver of claim 1, wherein the thresholding module is configured to determine a cutoff SINR, below which corresponding pre-processed symbol estimates are set to zero.

5. The receiver of claim 1, wherein the thresholding module is configured to determine an estimation strategy based on whether subchannel constellations are known.

6. The receiver recited in claim 1, further comprising a channel emulator configured to perform channel emulation.

7. The receiver of claim 6, further comprising:
    a companding module configured to generate the weighted soft decision for each of the plurality of pre-processed symbol estimates; and
    a canceller configured to produce at least one interference-cancelled signal from an output of the channel emulator.

8. A method of receiving a multipath signal in a receiver, the method comprising:
    providing for producing in the receiver a plurality of pre-processed signal-to-interference-and-noise ratio (SINR) estimates corresponding to a plurality of pre-processed symbol estimates from the multipath signal;
    providing for comparing each of the plurality of pre-processed SINR estimates to a predetermined threshold for determining whether to employ a weighted soft decision or a hard decision, wherein the weighted soft decision is determined according to a companding function that compresses at least one of the plurality of pre-processed SINR estimates; and
    providing for generating the weighted soft decision or the hard decision for each of the plurality of pre-processed symbol estimates to produce at least one interference-symbol estimate.

9. The method of claim 8, wherein providing for producing a plurality of pre-processed SINR estimates is configured for producing the plurality of pre-processed SINR estimates by averaging symbol walshes over at least one of a set of parameters, the set of parameters including time and a plurality of subchannels.

10. The method of claim 8, wherein providing for comparing is configured for determining an SINR below which weighted soft decisions provide better performance than hard decisions, and above which hard decisions provide better performance than weighted soft decisions.

11. The method of claim 8, wherein providing for comparing is configured for determining a second cutoff SINR, below which corresponding pre-processed symbol estimates are set to zero.

12. The method of claim 8, wherein providing for comparing is configured for determining an estimation strategy based on whether subchannel constellations are known.

13. The method of claim 8, further comprising providing for producing at least one interference-cancelled signal from a received baseband signal and the at least one interference-symbol estimate.

14. A chipset configured to receive a multipath signal, the chipset comprising:
    a signal-to-interference-and-noise ratio (SINR) estimation module in the chipset, the SINR estimation module configured to produce a plurality of pre-processed SINR estimates corresponding to a plurality of pre-processed symbol estimates from the multipath signal; and
    a thresholding module configured to compare each of the plurality of pre-processed SINR estimates to a predetermined threshold to determine whether to employ a weighted soft decision or a hard decision, wherein the weighted soft decision is determined according to a companding function that compresses at least one of the plurality of pre-processed SINR estimates.

15. The chipset of claim 14, wherein the SINR estimation module is configured to produce the plurality of pre-processed SINR estimates by averaging symbol amplitudes over at least one of a set of parameters, the set of parameters including time and a plurality of subchannels.

16. The chipset of claim 14, wherein the thresholding module is configured to determine an SINR below which weighted soft decisions provide better performance than hard decisions, and above which hard decisions provide better performance than weighted soft decisions.

17. The chipset of claim 14, wherein the thresholding module is configured to determine a cutoff SINR, below which corresponding pre-processed symbol estimates are set to zero.

18. The chipset of claim 14, wherein the thresholding module is configured to determine an estimation strategy based on whether subchannel constellations are known.

19. The chipset of claim 14, further comprising a channel emulator configured to perform channel emulation.

20. The chipset of claim 19, further comprising:
- a companding module configured to generate the weighted soft decision for each of the plurality of pre-processed symbol estimates; and
- a canceller configured to produce at least one interference-cancelled signal from an output of the channel emulator.

* * * * *